(12) United States Patent
Kamradt

(10) Patent No.: US 9,474,313 B2
(45) Date of Patent: Oct. 25, 2016

(54) ENERGY ABSORBING AND DISPLACING STRUCTURE FOR BODY PROTECTIVE PADDING

(71) Applicant: Brian Kamradt, Indianapolis, IN (US)

(72) Inventor: Brian Kamradt, Indianapolis, IN (US)

( * ) Notice: Subject to any disclaimer, the term of this patent is extended or adjusted under 35 U.S.C. 154(b) by 0 days.

(21) Appl. No.: 13/998,846

(22) Filed: Dec. 16, 2013

(65) Prior Publication Data

US 2016/0029724 A1  Feb. 4, 2016

(51) Int. Cl.
| | | |
|---|---|---|
| F16F 7/00 | (2006.01) | |
| A41D 31/00 | (2006.01) | |
| A41D 13/015 | (2006.01) | |
| F16F 3/087 | (2006.01) | |

(52) U.S. Cl.
CPC ........... *A41D 31/005* (2013.01); *A41D 13/015* (2013.01); *F16F 3/0876* (2013.01)

(58) Field of Classification Search
CPC ............ F16F 1/37; F16F 1/36; F16F 3/0876; F16F 1/373; F16F 1/374; F16F 1/422; F16F 1/426; F16F 7/121
USPC ........................................................ 267/141
See application file for complete search history.

(56) References Cited

U.S. PATENT DOCUMENTS

| | | | |
|---|---|---|---|
| 3,251,076 A | | 5/1966 | Burke |
| 3,525,663 A | * | 8/1970 | Hale ..................... B29C 51/006 405/36 |
| 3,713,640 A | | 1/1973 | Margan |
| 3,849,801 A | * | 11/1974 | Holt ....................... A42B 3/121 2/413 |
| 4,472,472 A | * | 9/1984 | Schultz ................ A41D 31/005 2/410 |
| 4,535,553 A | * | 8/1985 | Derderian ............ A43B 13/181 36/28 |
| 5,204,998 A | | 4/1993 | Liu |
| 5,518,802 A | | 5/1996 | Colvin et al. |
| 6,029,962 A | * | 2/2000 | Shorten ................ A43B 13/181 267/145 |
| 6,378,140 B1 | | 4/2002 | Abraham et al. |
| 6,547,280 B1 | * | 4/2003 | Ashmead ................. F16F 7/121 180/90 |
| 6,777,062 B2 | | 8/2004 | Skaja |
| 7,673,351 B2 | | 3/2010 | Copeland et al. |
| 7,774,866 B2 | | 8/2010 | Ferrara |
| 8,726,424 B2 | | 5/2014 | Thomas et al. |
| 2007/0190293 A1 | | 8/2007 | Ferrara |
| 2010/0186150 A1 | | 7/2010 | Ferrara et al. |
| 2010/0258988 A1 | | 10/2010 | Darnell et al. |
| 2014/0007322 A1 | * | 1/2014 | Marz ...................... A42B 3/065 2/411 |

FOREIGN PATENT DOCUMENTS

EP        0736278 A1     9/1996

\* cited by examiner

*Primary Examiner* — Robert A Siconolfi
*Assistant Examiner* — Mahbubur Rashid
(74) *Attorney, Agent, or Firm* — Barnes & Thornburg LLP

(57) ABSTRACT

This invention is an improved padding used by athletes and others to prevent or greatly reduce the instances of injury due to blows to the body. This is accomplished through the utilization of a radial expanding and contracting structure encapsulated in a foam type material.

2 Claims, 4 Drawing Sheets

ENERGY ABSORBING AND DISPLACING STRUCTURE FOR BODY PROTECTIVE PADDING

TECHNICAL FIELD

The present invention relates generally to protective padding for an individual's body, for protecting against blows imparted upon the body.

BACKGROUND OF THE INVENTION

Body protective padding is commonly worn by participants of contact sports for the purpose of preventing injuries. In these contact sports, various situations may cause injuries. Examples of these situations include tackling or otherwise bumping into other players, falling to the ground, being struck by another player's equipment, or being struck by a game ball itself. Of course, body protective padding may reduce or prevent injuries resulting from various other circumstances, including those not associated with contact sports.

Existing body protective padding utilize a relatively significant amount of foam padding and layering of other materials for absorbing the energy of blows delivered to the body. As is known in the art, the amount of energy that can be absorbed is directly related to the thickness of the foam being used. Foam padding and layering of materials and its ability to absorb energy is directly related to its mass and its ability to deform.

A drawback of using a foam padding and layering of materials is its ability to absorb and displace energy is directly related to its mass and its ability to deform. This makes the padding thick and bulky and restricts the player's freedom of movement. Since absorbing and displacement of energy is needed to prevent injury and thin unrestricting athletic padding are known for allowing players freedom of movement, the foam padding and layering of other materials and its thick, bulky and restrictive properties are all undesirable results. Therefore, a need exists for body protective padding that can absorb and displace the energy from a powerful blow, is thin, not bulky and allows for greater freedom of movement.

In view of the above, it is an object of the present invention to provide an improved pad means particularly adapted for use in body protection.

SUMMARY OF THE INVENTION

It is therefore an object of the present invention to provide an improved protective padding particularly adapted for body protection.

It is another object of the present invention to provide protective padding that is durable and can withstand a substantial number of blows over a significant period of time.

It is another object of the present invention to provide protective padding that can absorb and displace the energy from blows.

It is another object of the present invention is to provide a protective padding in the form of at least two padded layers having radial expanding and contracting structure like means mounted there between.

It is another object of the present invention is to provide protective padding which utilizes a combination of foam type material, an encapsulated radial expanding and contracting structure.

It is another object of the present invention is to provide a protective pad means including the use of elastic polymer radial expanding and contracting structures.

It is another object of the present invention is to provide a plurality of elastic polymer radial expanding and contracting structures encapsulated in protective padding.

In accordance with the above and other objects of the present invention, a protective pad is provided for protection of blows imparted upon the body of a user. The protective pad includes an inner rigid elastomeric dome shaped member and an outer ring of flexible rubber like material, combined the structure works like a spring allowing for expansion and contraction.

The combination of these elements allows for the absorption and displacement of the energy of a blow delivered to an individual's body.

One advantage of the present invention is that a user is protected from harmful forces that may injure his body.

Another advantage of the present invention is that it has a minimized weight for permitting a user to expend more energy participating in an ongoing activity.

Other advantages of the present invention will become apparent when viewed in light of the detailed description of the preferred embodiment when taken in conjunction with the attached drawings and appended claims.

The above is accomplished through the provision of a shock absorbing radial expanding and contracting structure. The inner layer of the pad consist of a plurality of rigid elastomeric dome shaped members combined with outer rings of flexible rubber like material that together work as a spring and are encapsulated by an outer layer of foam. Upon impact, the structure compress to absorb the shock of the blow while the foam layers cushion the blow additionally.

DETAILED DESCRIPTION OF INVENTION

With further reference to the drawings, the improved protective padding of the present invention, indicated generally at 10, can have various exterior configurations depending on the part of the body the pad is designed to protect.

Figure 1:
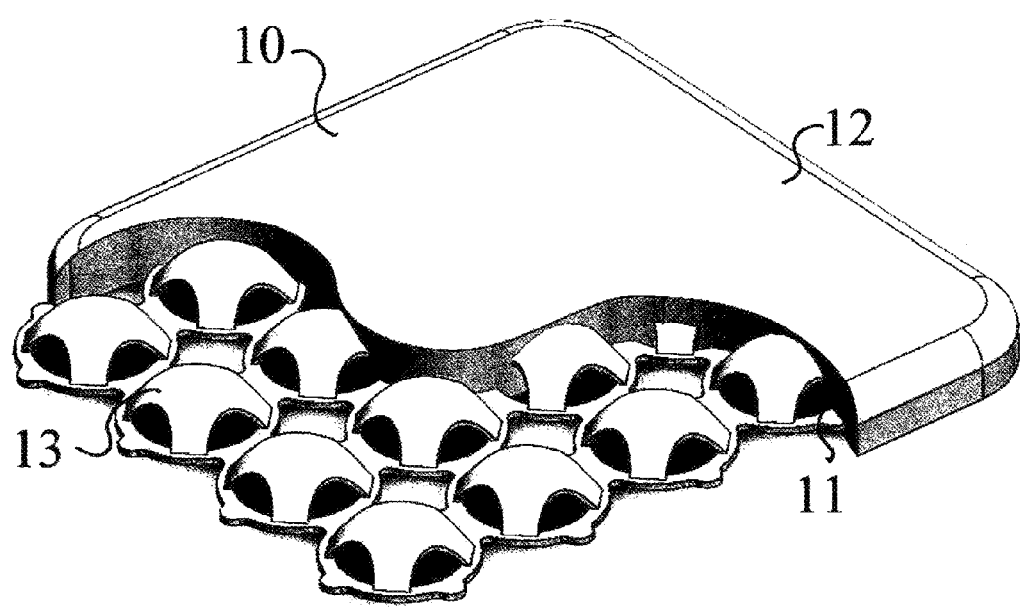
FIG. 1 is a perspective view of a hip type protective pad incorporating the cushioning means of the present invention.

Referring specifically to FIG. 1 this embodiment is specifically designed as a protective hip pad, which with slight modifications, can be used as an elbow or knee pad.

The FIG. 1 embodiment includes an outer pad 11, preferably formed from a foam type material which is preferably coated on the outer surface 12 thereof with a material such as tear resistant type. The thickness of the pad 11 is approximately ⅜ of an inch although it can be either greater or lesser as deemed appropriate.

A plurality of radial expanding and contracting structure 13 are provided between the outer pads as seen clearly in FIG. 1. The radial expanding and contracting structure 13 are formed from an elastomeric polymer or similar material as can clearly be seen in FIG. 1 and FIG. 2. The radial expanding and contracting structure as described above is encapsulated between the outer flexible foam or sponge like pad 11.

Figure 2:
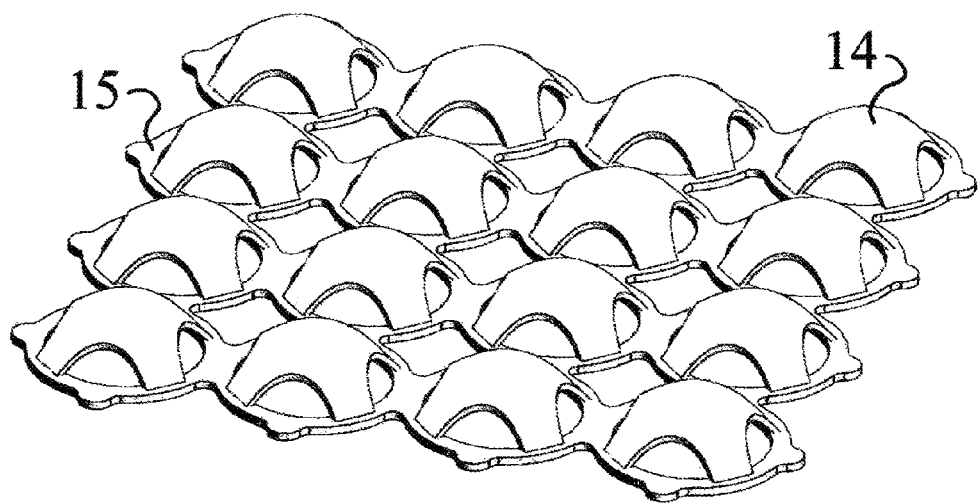
FIG. 2 is a perspective view of the radial expanding and contracting structure portion of the present invention before force is applied.

The FIG. 2 embodiment includes a plurality of rigid elastomeric dome shaped members 14 combined with outer rings of flexible rubber like material 15 that together work as a spring.

Figure 5:
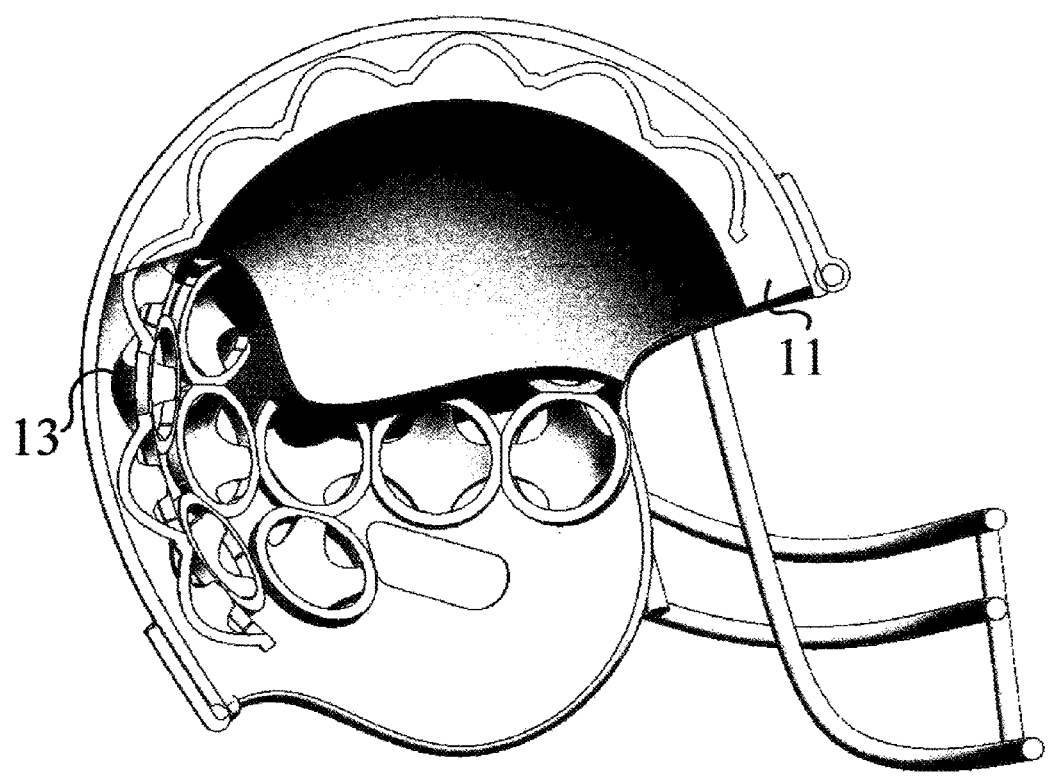
FIG. 5 is a cutaway view of helmet padding incorporating the present invention.

FIG. 5 further illustrates use of the improved protective padding 10 of the present invention by incorporating the same into a protective helmet.

The improved protective padding in the present invention can either be secured directly as a backing to hard shell guards thereof as disclosed in FIG. 5 and or can be placed in clothing pockets provided for the purposes such as are knee pads and hip pads in a football pants.

The radial expanding and contracting structure encapsulated in foam like material creates a structure for absorbing the forces of a blow, thereby reducing the adverse effects of impact in a manner previously unattained.

Importantly, the radial expanding and contracting structure like design and foam like material working in conjunction provides for complete memory, which is instantaneous upon release of the force exerted. In addition, the structure functions to allow the radial expanding and contracting structure member (13) to receive the primary forces, the foam or sponge (11) distributes forces to the user holds the structure together. As such, the assembly compresses in a unique manner to absorb the force and displace the energy of impact received.

Figure 3:
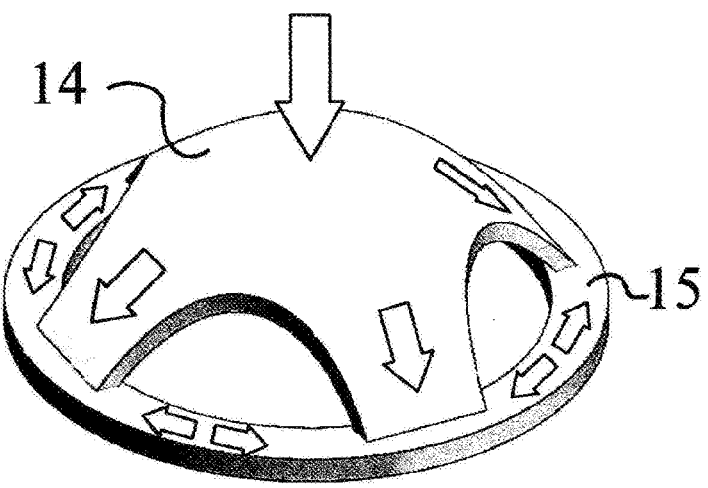
FIG. 3 is a perspective view of the radial expanding and contracting structure portion of the present invention after force is applied.
Figure 4:
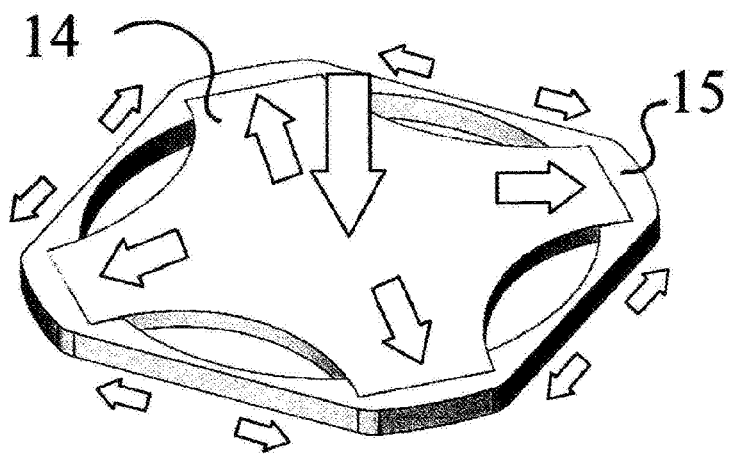
FIG. 4 is a cutaway view of the cushioning means of the present invention.

FIG. 2 illustrates the radial expanding and contracting structure separated from the foam component. As force is applied the radial expanding and contracting structure will deform FIG. 3. Through deformation we have redirection of force. The force will turn at the junction point and be redirected laterally resulting in a reduction of force. The combined structure as seen in FIG. 1 works in unison, as opposed to a single rigid structure attempting to absorb all forces received. This simply allows for a far greater amount of energy absorbed by the assembly of the present invention. Thus the present invention will mitigate the incidence of pain and injuries.

What is claimed is:

1. A protective pad, comprising:
a body having an outer radial edge, and
an outer ring secured to and extending circumferentially around the outer radial edge of the body,
wherein the body is more rigid than the outer ring,
wherein the body and outer ring are expandable and contractible between (i) a first configuration in which the outer ring defines a first outer dimension and (ii) a second configuration in which the outer ring defines a second outer dimension greater than the first outer dimension, and
wherein the body is dome-shaped in the first configuration and the body is substantially flat in the second configuration.

2. A protective pad comprising:
a foam layer, and
a plurality of energy-absorbing devices positioned in the foam layer, each device including a body having an outer radial edge, an outer ring secured to and extending circumferentially around the outer radial edge of the body, and a compressible foam core positioned in the body,
wherein each energy-absorbing device is expandable and contractible between (i) a first configuration in which the outer ring defines a first outer dimension and (ii) a second configuration in which the outer ring defines a second outer dimension greater than the first outer dimension, and
wherein the body is dome-shaped in the first configuration and the body is substantially flat in the second configuration.

* * * * *